United States Patent [19]
Kitagaki et al.

[11] Patent Number: 5,504,560
[45] Date of Patent: Apr. 2, 1996

[54] PHOTOSENSITIVE MEMBER-PROTECTIVE SHUTTER

[75] Inventors: Yasunari Kitagaki, Kobe; Seishi Ojima, Takatsuki; Kenji Masaki, Nagaokakyo; Izumi Osawa, Ikeda, all of Japan

[73] Assignee: Minolta Co., Ltd., Osaka, Japan

[21] Appl. No.: 314,628

[22] Filed: Sep. 29, 1994

[30] Foreign Application Priority Data

Oct. 1, 1993 [JP] Japan ................................. 5-246714
Oct. 1, 1993 [JP] Japan ................................. 5-246742
Oct. 1, 1993 [JP] Japan ................................. 5-246747

[51] Int. Cl.$^6$ ............................................. G03G 15/02
[52] U.S. Cl. ....................................... 355/215; 355/221
[58] Field of Search ................................ 355/200, 215, 355/221, 225, 219

[56] References Cited

U.S. PATENT DOCUMENTS 4,325,625  4/1982  Nakatsubo et al. ............... 355/221 X
4,851,879  7/1989  Imaue et al. ...................... 355/219 X

FOREIGN PATENT DOCUMENTS 52-49839   4/1977  Japan .
61-50170   3/1986  Japan .
63-4555    1/1988  Japan .
4-55870    2/1992  Japan .
4-194963   7/1992  Japan .

Primary Examiner—Nestor R. Ramirez
Attorney, Agent, or Firm—Burns, Doane, Swecker & Mathis

[57] ABSTRACT

The present invention relates to an image forming apparatus having a rotatably disposed photosensitive member, a charger disposed in opposed relation to the surface of the photosensitive member for charging the surface of the photosensitive member, and a protection shutter disposed adjacent to the charger, the shutter having a protecting member which statically adheres to the surface of the photosensitive member to shield the surface of the photosensitive member from the charger.

30 Claims, 6 Drawing Sheets

1

PHOTOSENSITIVE MEMBER-PROTECTIVE SHUTTER

BACKGROUND OF THE INVENTION

1. Field of the Invention

The present invention relates to a photosensitive member-protective shutter for use in electrophotographic apparatuses and/or a shielding member for the photosensitive member-protective shutter.

2. Description of the Prior Art

In an electrophotographic apparatus, the surface of a photosensitive member is first statically charged by a charger and is then exposed so that an electrostatic latent image is formed on the surface of the photosensitive member. The latent image is developed by toner to form a toner image, the toner image being then transferred onto a recording medium. Finally, the surface of the photosensitive member is subjected to electrostatic discharge so that any residual electrostatic latent image on the surface of the photosensitive member is removed to complete an image forming operation.

As such image forming operation is repeated with the electrophotographic apparatus, the charger is subject to accumulation of statically produced products, such as ozone and nitrogen oxides (NOx) produced through corona discharge of the charger, or nitrates produced through adsorption of nitrogen oxide (NOx) onto the charger, during the image-forming process. Since the charger is disposed in opposed relation to the photosensitive member, the statically produced products accumulated on the charger may move close to or migrates to the surface of the photosensitive member during stopping of the movement of the photosensitive member, the statically produced product thus degrading the photosensitive member.

The degraded portion of the photosensitive member is liable to moisture or water deposition, which leads to low electrical resistance, thus causing a charge flow. This results in image flowing. This tendency becomes more pronounced under high-temperature and high-humidity conditions in particular.

If the surface of the photosensitive member is soft, portions of the photosensitive member which have been deteriorated due to statically produced products thereon may be scraped down by means of a blade simultaneously when toner remaining on the surface of the photosensitive member after transfer is removed. In such a case the above noted problem is not so much noticeable.

However, if the surface of the photosensitive member is substantially hard, it is not easy to scrape down the deteriorated portions by a blade or the like, in which case once the photosensitive member is deteriorated by the statically produced products, it is difficult to recover the degraded portions to normal states, and this poses a serious problem.

SUMMARY OF THE INVENTION

It is a primary object of the present invention to prevent the occurrence of any image flow in electrophotographic machines.

It is another object of the invention to prevent migration of statically produced products to a photosensitive member which may lead to deterioration of the photosensitive member, thus resulting in image flow.

It is still another object of the invention to provide a shielding member for protection of photosensitive member which has high mechanical strength and good corrosion resistance.

DETAILED DESCRIPTION OF THE INVENTION

Figure 1:
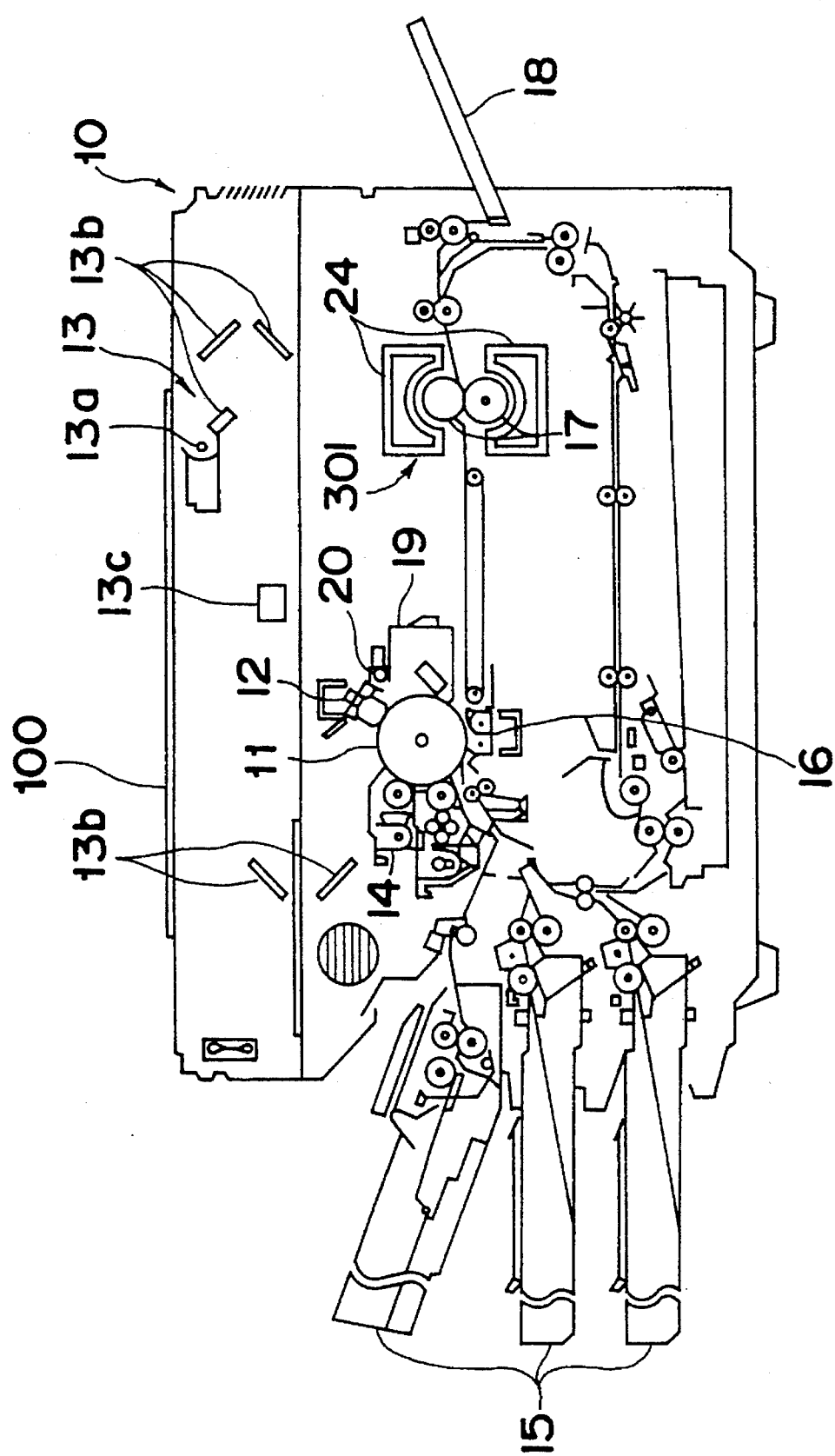
FIG. 1 is a schematic block diagram of an image forming apparatus in accordance with the invention.

FIG. 1 shows an image forming apparatus to which a photosensitive member-protective shutter according to the present invention is applicable.

As illustrated, the apparatus has a housing 10 containing a rotatable photosensitive member 11. The surface of the photosensitive member 11 in rotation is charged by a main charger 12. An exposure device 13 including an exposure lamp 13a, mirrors 13b and a lens 13c exposes the charged surface of the photosensitive member 11 to a document image through a platen glass 100 for supporting a document. As a result, an electrostatic latent image is formed on the surface of the photosensitive member 11.

Subsequently, toner is supplied from a developing device 14 to the surface of the photosensitive member 11 carrying the electrostatic latent image, thereby forming a toner image on the surface of the photosensitive member 11. The toner image formed on the surface of the photosensitive member 11 is transferred by a transfer and separating charger 16 onto recording paper (not shown) introduced from a paper supply cassette 15. The toner image thus transferred is fixed to the recording paper by heated fixing rollers 17. Thereafter the recording paper is discharged onto a discharge tray 18. The toner remaining on the surface of the photosensitive member 11 after the image transfer to the recording paper is removed from the photosensitive member 11 by a cleaning device 19 such as a blade. Then the electric charge is eliminated from the surface of the photosensitive member 11 by an eraser lamp 20, and an image forming operation is finished. This image forming operation is repeated.

The photosensitive member-protective shutter according to the present invention is arranged adjacently to the charger and have at least such a constitution as can insert a film between the photosensitive member and the charger as a shielding member and can store the film therein.

According to the present invention, a film which is electrostatically attachable to the surface of the photosensitive member is used as a shielding member of the photosensitive member-protective shutter, whereby the photosensitive member is shielded from the charger while the film is electrostatically held in adhesion with the photosensitive member, the photosensitive member being thus protected. Through such arrangement it is possible to prevent statically produced products from going into adhesion with the surface of the photosensitive member through the clearance between the protective shutter and the photosensitive member.

Films available for use in the shutter of the present invention are not particularly limited inasmuch as they can statically adhere to the surface of the photosensitive member. Examples of useful films are resin films, such as teflon, polyimide, polyethylene and polyester. In particular, teflon, polyimide and polyethylene films are preferred which have good strength characteristics and are less liable to change in strength due to the action of any statically produced matter.

A first embodiment according to the present invention will be explained hereinafter.

Figure 2:
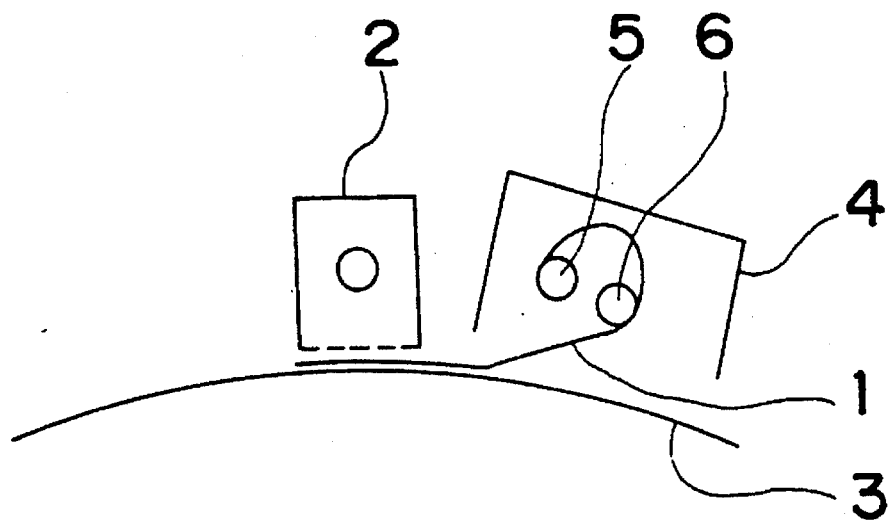
FIG. 2 is a schematic block diagram of first and second embodiments of a photosensitive member-protective shutter when a copying operation is stopped.

The photosensitive member-protective shutter of the first embodiment is such that when a copying operation is stopped, as FIG. 2 illustrates by way of example, a film (1) supported by shutter support rods (5), (6) in a shutter case (4) covers the surface of a photosensitive member (3) as the film is drawn from the shutter case, thereby to protect the photosensitive member from statically produced products.

Figure 3:
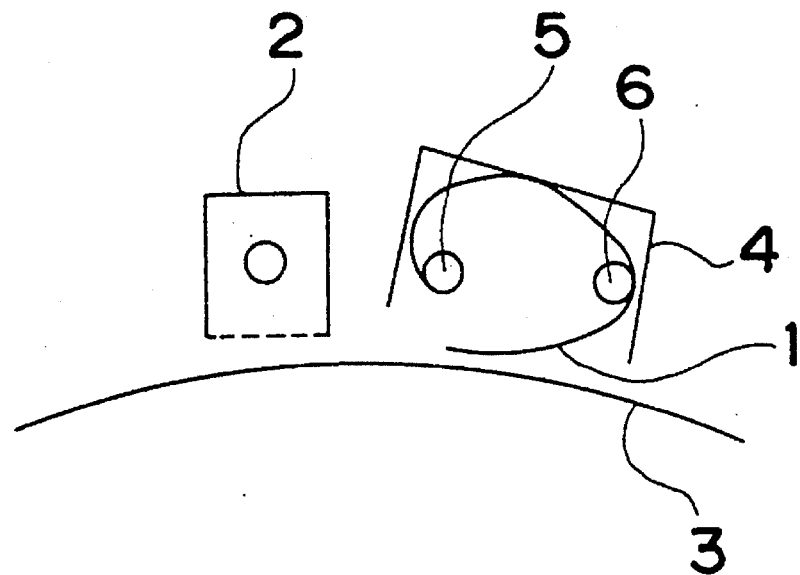
FIG. 3 is a schematic block diagram of the first and second embodiments of the photosensitive member-protective shutter during a copying operation.

During a copying operation, as illustrated in FIG. 3, the film (1) is wound up by the shutter support rods (5), (6) into the shutter case (4) so that the surface of the photosensitive member is ready for being charged by a charger (2). The start of a copying operation is determined by depression of a copy-starting button of the copying machine, and there is provided a driving mechanism for automatically actuating the support rods to wind up the film.

The processes from the condition in which the film of the photosensitive member-protective shutter is wound on the shutter support rods as shown in FIG. 3 to the condition in which the film covers the surface of the photosensitive member below the charger (2) will be explained hereinbelow.

After completion of a copying operation but before the rotation of the photosensitive member is stopped, the photosensitive member (3) is charged up to a predetermined voltage, e.g., about 50 V. While the photosensitive member is rotated at a given peripheral speed (e. g., 38 cm/sec), the film (1) is brought into intimate contact with the surface of the photosensitive member by the help of electrostatic force generated between the photosensitive member (3) and the film (1). The film which is in such contact state is drawn from the shutter case by rotational force of the photosensitive member, the film being thus brought into the FIG. 2 condition. In this case, the two support rods (5) and (6) are brought closer to each other to help the film in being drawn from the case. It may be noted in this connection that if there is a potential difference of not less than 50 V between the film (1) and the photosensitive member (3), the film (1) can be successfully drawn from the case. A surface voltage of not less than 50 V in the photosensitive member may be obtained, for example, by adjusting the voltage applied by the charger; by adjusting the quantity of light of a erasing lamp after charging; or by using a photosensitive member with a residual potential of not less than 50 V. In another alternative, a bias voltage may be applied between the photosensitive member (3) and the film (1) to bring them into close contact.

Film winding, as illustrated in FIG. 3, is carried out in such a way that with the film fixed at the support rod (5), the space between the two support rods (5), (6) are made widen. In this case, it may be arranged in such a way that both support rods are movable, or the one support rod (5) is fixed and the other support rod (6) only is movable. Alternatively, it may be arranged in such a way that there is provided only one support rod rotatable for winding the film thereon.

Figure 4:
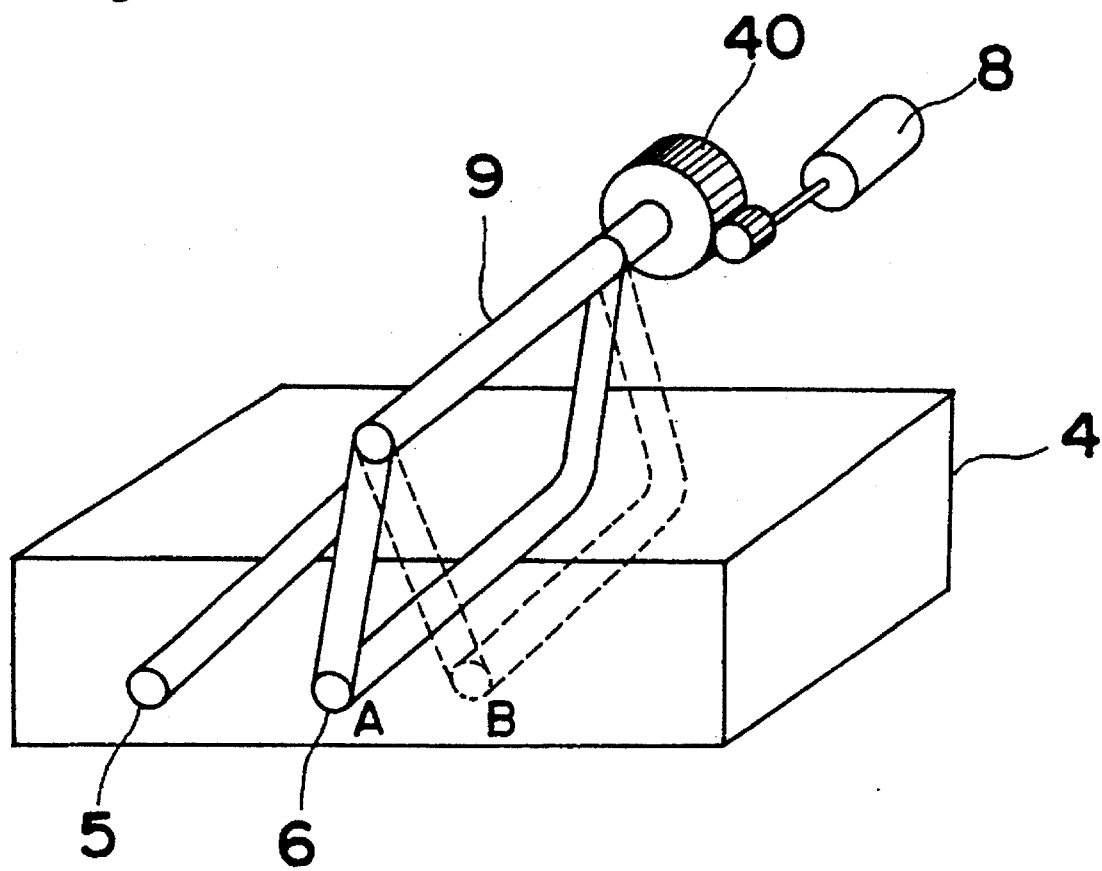
FIG. 4 is a schematic illustration of a film-winding mechanism in the protective shutter as shown in FIG. 2 and FIG. 3.

One example of a more detail winding process of the film 1 is illustrated below by referring to FIG. 4 and FIG. 5. In FIG. 4, the support rod (5) is fixed. Only the support rod (6) is movable. The winding-up of the film (1) is carried out by shifting the support rod (6) from a position A to a position B. A driving rod (9) and the support rod (6) are integrally formed. The driving rod (9) is driven by a motor (8) connected through a gear (40). As a result, as the driving rod is rotated, the support rod (6) located at the position A is shifted to the position B.

Figure 5:
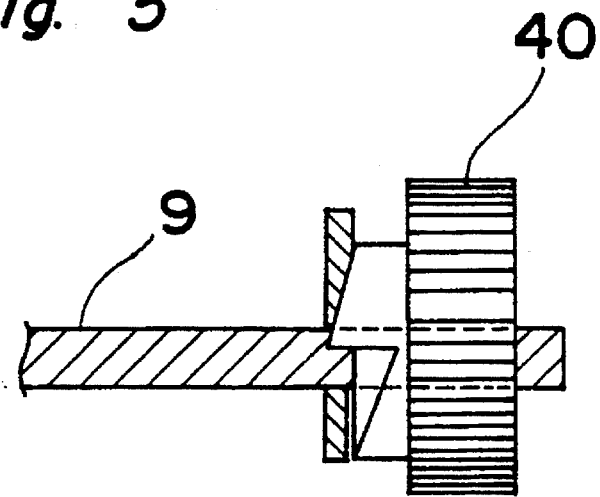
FIG. 5 is a schematic view of the connection portion of the gear to the driving rod in FIG. 4.

The connection portion of the gear (40) to the driving rod (9) is composed of a camshaft as shown in FIG. 5. Accordingly the shift of the support rod (6) from the position B to the position A is carried out without use of the motor (8) only by the help of electrostatic force generated between the film (1) and the photosensitive member (3).

During copying operation, as FIG. 3 shows, a leading end of the film (1) is in contact with the photosensitive member (3). The photosensitive member useful for the purpose of the present invention are those having a hard surface, for example, an amorphous silicon (a-Si) photosensitive member, a selenium-arsenic ($As_2Se_3$) photosensitive member, and a photosensitive member having an amorphous carbon (a-C) layer on its surface. When copying operations are successively made, the surface of the photosensitive member may be subject to being damaged by the leading edge of the film (1). Such damage may cause an image noise. In order to obviate such disadvantage, it is desirable that a forward end portion of the film which contacts the surface of the photosensitive member is rounded as shown in FIG. 4 so that an edge portion of the forward end of the film may be kept away from contact with the surface of the photosensitive member.

Figure 6:
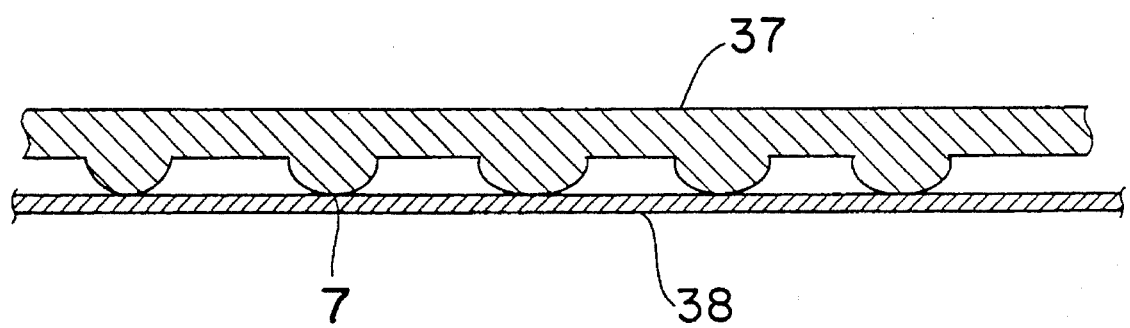
FIG. 6 is a partly sectional fragmentary schematic view showing one form of film according to the invention.

Further, it is effective to provide semispherical convex portions 7 on a surface of the film 37 which comes in contact with the surface of the photosensitive member 38 as shown in FIG. 6. By so arranging it is possible to reduce frictional force acting between the photosensitive member and the film thereby to reduce the amount of frictional wear with respect to both the photosensitive member and the film. The convex portions are preferably rounded at their apexes. A sharp edge portion may damage the surface of the photosensitive member.

The film used in the present invention may comprise two types of films laminated one over the other. For example, the film is comprised of a resin less subject to the effect of a statically produced compound, e. g., polyimide, on one side of the film which is positioned closer to the charger, and a resin less subject to frictional wear with the photosensitive member on the other side on which the film contacts the photosensitive member. Additionally, another layer intended for adjusting electrostatic attraction with respect to the photosensitive member may be placed between the two layers to provide for a three layer constitution.

A thickness and strength of the film used in the present invention is preferably so selected as to meet the relation $\sigma_0 \geq 10 f_{max}/S$, where $\sigma_0$ represents rapture stress of the film (kg/cm$^2$), $f_{max}$ represents a maximum load (kg) exerted on the shutter support rod (5) in the course of shifting from the FIG. 3 condition to the FIG. 2 condition, and S represents sectional area of the film (cm$^2$). If this relation is not satisfied, there may occur film rupture or elongation. Even though the above relation is not satisfied, if the relation $f_{max}/S \leq \sigma_0 \leq 10 f_{max}/S$ is met, the film may be used as such because the film is not liable to fracture or elongation, though the film has some undesirable stress applied thereon. In tests conducted, maximum load value $f_{max}$ was determined on the basis of measurements of loads exerted on the film which were made by means of a spring balance attached to the support rod (5). Measurements of stress at rupture were made according to the method prescribed under JIS K6723.

Photosensitive Members Used

The following three types of photosensitive members were used:

K1: amorphous silicon (a-Si) photosensitive member;

K2: selenium-arsenic (As$_2$Se$_3$) photosensitive member; and

K3: photosensitive member having a charge generating layer containing bisazo pigment, a charge transporting layer containing a hydrazone compound, and an amorphous carbon (a-C) layer serving as a surface protective layer.

Types of Films Used

Teflon: Teflon-PFA-Lp type, made by Mitsui, du Pont, Fluorochemical Company.

Polyimide: KAPTON H type, made by Toray K.K.

Polyethylene: "Mirason 24H", made by Mitsui Sekiyu Kagaku K.K.

Polyester: "Glylux-E200", made by Dainippon Ink K.K.

Polyurethane: "Pandex-T5108", made by Dainippon Ink K.K.

Experimental Equipment

As an experimental equipment was used a commercially available copying machine (Model EP8600, made by Minolta Camera K.K.), which was so modified as to enable switching between positive charging and negative charging according to the charging polarity of the photosensitive member used, with adaptation for mounting therein a photosensitive member-protective shutter capable of such configuration as shown in FIG. 2 or FIG. 3.

Shifting from the stored film condition of FIG. 3 to the protecting film condition of FIG. 2 was made by charging photosensitive member (3) to 50 V, rotating it at a peripheral speed of 38 cm/sec, causing the film (1) to come into intimate contact with the surface of the photosensitive member by the help of a static force thus generated, and thereby drawing the film (1) from shutter case (4).

Shifting from the protecting film condition of FIG. 2 to the stored film condition of FIG. 3 was effected by fixing in position one support rod (5) which held the film (1) at one end, and by moving the other support rod (6) to increase the distance between the two rods.

Film Evaluation

Measurements were made of maximum load $f_{max}$ (kg) as exerted on shutter support rod (5) in the course of shifting from the FIG. 3 condition to the FIG. 2 condition. With film sectional area represented by S(cm$^2$) and rupture stress by $\sigma_0$(kg/cm$^2$), the following criteria were used for evaluation of strength characteristics:

$\sigma_0 \geq 10 f_{max}/S$: o (strength sufficient)

$f_{max}/S \leq \sigma_0 \leq 10 f_{max}/S$: Δ (practically no problem in strength)

$f_{max}/S \geq \sigma_0$: x (strength insufficient, with problem for practical use)

It is noted that "sectional area S" means a cross sectional area of 0.1 mm (film thickness)×290 mm (film width). Values for rupture stress $\sigma_0$ are values obtained through measurements made according to JIS K6723.

Further, the process of on/off switching of the charger was repeated at an interval of one second for 24 hours and 168 hours in the FIG. 2 condition. Films were evaluated with respect to their strength characteristics after 24-hour and 168-hour repetitions of such process. The results of the evaluation tests are shown in the following tables.

TABLE 1

| | K1 Photosensitive member | | | |
|---|---|---|---|---|
| Type of Film | Initial strength Characteristic (Kg/cm$^2$) | After 24-hours use (kg/cm$^2$) | After 168-hours use (kg/cm$^2$) | $f_{max}/S$ (Kg/cm$^2$) |
| Teflon | o (320) | o (305) | o (303) | 25 |
| Polyimide | o (455) | o (485) | o (496) | 36 |
| Polyethylene | o (432) | o (444) | o (496) | 33 |
| Polyester | Δ (210) | Δ (202) | Δ (215) | 22 |

TABLE 2

| | K2 Photosensitive member | | | |
|---|---|---|---|---|
| Type of Film | Initial strength Characteristic (Kg/cm$^2$) | After 24-hours use (kg/cm$^2$) | After 168-hours use (kg/cm$^2$) | $f_{max}/S$ (Kg/cm$^2$) |
| Teflon | o (320) | o (305) | o (303) | 20 |
| Polyimide | o (455) | o (485) | o (496) | 36 |
| Polyethylene | o (432) | o (444) | o (496) | 31 |
| Polyester | Δ (210) | Δ (202) | Δ (215) | 25 |

TABLE 3

| | K3 Photosensitive member | | | |
|---|---|---|---|---|
| Type of Film | Initial strength characteristic (Kg/cm$^2$) | After 24-hours use (kg/cm$^2$) | After 168-hours use (kg/cm$^2$) | $f_{max}/S$ (Kg/cm$^2$) |
| Teflon | o (320) | o (305) | o (303) | 15 |
| Polyimide | o (455) | o (485) | o (496) | 41 |
| Polyethylene | o (432) | o (444) | o (496) | 41 |
| Polyester | o (210) | o (202) | o (215) | 29 |

Teflon, polyimide and polyethylene exhibit good initial strength characteristics and are less liable to change in strength due to statically produced matter. In contrast, polyester has no sufficient initial strength, though it is not so much liable to change in strength due to statically produced product.

Image Evaluation

As an experimental unit was used a copying machine, model EP8600 (made by Minolta Camera K.K.), which was modified so as to be capable of charging to either positive or negative polarity, with a photosensitive member-protective shutter of the invention being mounted therein. Copying tests were made in such a manner that "a copying process was repeated ten thousand times a day and thereafter the shutter is allowed to stand in a protecting condition until the following day", which is counted as one cycle. This process was repeated every day. For comparison purposes, copying tests were also conducted without such shutter protection as above mentioned. The copying tests were made under the conditions of ambient temperature 30° C. and relative humidity 85%. Where the protective shutter was not actuated, it was observed with K1 and K2 photosensitive members that image flow occurred after 50 thousand copies were made, while with K3 photosensitive member image flow occurred after 70 thousand copies were made. Where the protective shutter was actuated, no image flow occurred with K1, K2 and K3 photosensitive members even after 200 thousand copies were made.

A second embodiment of the present invention will now be explained. The protective shutter of the second embodiment is substantially identical in constitution with the protective shutter of the first embodiment, except for the characteristics of the film used. Therefore, description is omitted of the constitution of the second embodiment shutter.

Films exemplified for use in the second embodiment of the shutter have semiconductive characteristics which are intermediate between insulative and conductive characteristics, provided that they can statically adhere to the surface of a photosensitive member. By using a film having such semiconductive characteristics it becomes possible to put the film back more smoothly in the protective shutter without error, particularly when the film is in statically adherent condition. Further, use of such film eliminates the possibility of the photosensitive member being driven into abnormal rotation in the event that any error should occur in connection with film storing.

The term "semiconductive characteristics" used herein means that the film has a volume resistance within a range between $10^4$ and $10^{12}$ Ω·cm, preferably $10^5$ and $10^{10}$ Ω·cm, more preferably $10^6$ and $10^8$ Ω·cm. If the volume resistance is more than $10^{12}$ Ω·cm, electrostatic adhesion of the film to the photosensitive member is large, so that errors which may occur during film-storing operation may not be removed effectively. If the volume resistance is appreciably smaller than $10^5$ Ω·cm, there may not occur any static attraction between the photosensitive member and the film, with the result that the film may not be effectively drawn onto the surface of the photosensitive member.

A film having such semiconductive characteristics may be obtained by incorporating 5 to 20 percent by weight (referred to as "wt %" hereinafter), preferably 7 to 15 wt %, more preferably 10 to 12 wt %, of carbon into a resin film, such as teflon, polyimide, polyethylene or polyester. Carbon may be so incorporated by dispersing carbon particles into the resin, or impregnating a carbon filler with resin. If the carbon content is less than 5 wt %, there occurs no decrease in resistance enough to achieve the effects of the second embodiments. If the carbon content is more than 20 wt %, the resistance level of the film is unacceptably low.

Fine particles of metal or an organic conductive compound may be incorporated instead of carbon. Such materials impart semiconductive characteristics to the film in same way as carbon does. The content may be suitably selected so as to provide electric conductivity as aforesaid.

Photosensitive Members Used

The same three types of photosensitive members K1, K2 and K3 as above mentioned were used.

Types of Films Used

The following films, with carbon contained therein, were used. The proportions of carbon added are shown in Table 4 given hereinbelow.

Teflon: Teflon-PFA-Lp type, made by Mitsui, du Pont, Fluorochemical Company.

Polyimide: KAPTON H type, made by Toray K.K.

Polyethylene: "Mirason 24H", made by Mitsui Sekiyu Kagaku K.K.

Polyester: "Glylux-E200", made by Dainippon Ink K.K.

Polyurethane: "Pandex-T5108", made by Dainippon Ink K.K.

Experimental Equipment

As an experimental equipment was used a commercially available copying machine (Model EP8600, made by Minolta K.K.), which was so modified as to enable switching between positive charging and negative charging according to the charging polarity of the photosensitive member used, with adaptation for mounting therein a photosensitive member-protective shutter capable of such configuration as shown in FIG. 2 or FIG. 3.

Shifting from the stored film condition of FIG. 3 to the protecting film condition of FIG. 2 was made by charging photosensitive member (3) to 50 V, rotating it at a peripheral speed of 38 cm/sec, causing the film (1) to come into intimate contact with the surface of the photosensitive member by the help of a static force thus generated, and thereby drawing the film (1) from shutter case (4).

Shifting from the protecting film condition of FIG. 2 to the stored film condition of FIG. 3 was effected by fixing in position one support rod (5) which held the film (1) at one end, and by moving the other support rod (6) to increase the distance between the two rods. In the present example, the shifting operation of the support rod (6) was manually performed.

Evaluation

Film-Adhering Properties

Observation was made as to clearance between the film and the photosensitive member when shifting from the FIG. 3 condition to the FIG. 2 condition was made. The observation was ranked as follows.

o: There was little or no clearance.

Δ: There was a clearance between film and photosensitive member.

x: Film was not adhered to photosensitive member without film shifting to FIG. 2 condition.

Film Releasability

Observation was made as to whether the photosensitive member turns in normal way when it is rotated under FIG. 2 conditions. The observation was ranked as follows.

o: Attraction between photosensitive member and film was reduced to allow photosensitive member to be rotated.

x: Rotation of photosensitive member was stopped by attractive force from film.

Evaluation results are tabulated below. In any combination of photosensitive member with film where the amount of carbon was less than 5 wt %, the static attraction between the film and the photosensitive member was so strong that some abnormality occurred in photosensitive member operation. Where the amount of carbon was more than 20 wt %, static attraction was so low that the film did not go into sufficient contact, or the film failed to shift to FIG. 2 condition.

TABLE 4

K1 Photosensitive member

| Film Type | Carbon Loadings | Film Contact | Film Releasability |
|---|---|---|---|
| Teflon | 0% | o | x |
|  | 5% | o | o |
|  | 20% | o | o |
|  | 30% | x | o |
| Polyimide | 0% | o | x |
|  | 5% | o | o |
|  | 10% | o | o |
|  | 30% | Δ | o |
| Polyethylene | 0% | o | x |
|  | 3% | o | x |
|  | 5% | o | o |
|  | 10% | o | o |
| Polyester | 0% | o | x |
|  | 10% | o | o |
|  | 20% | o | o |
|  | 30% | Δ | o |
| Polyurethane | 0% | o | x |
|  | 5% | o | o |
|  | 10% | o | o |
|  | 20% | o | o |
|  | 30% | x | o |

TABLE 5

K2 Photosensitive member

| Film Type | Carbon Loadings | Film Contact | Film Releasability |
|---|---|---|---|
| Teflon | 0% | o | x |
|  | 5% | o | o |
|  | 20% | o | o |
|  | 30% | x | o |
| Polyimide | 0% | o | x |
|  | 5% | o | o |
|  | 10% | o | o |
|  | 30% | x | o |

TABLE 6

K3 Photosensitive member

| Film Type | Carbon Loadings | Film Contact | Film Releasability |
|---|---|---|---|
| Teflon | 0% | o | x |
|  | 5% | o | o |
|  | 20% | o | o |
|  | 30% | x | o |
| Polyimide | 0% | o | x |
|  | 5% | o | o |
|  | 10% | o | o |
|  | 30% | x | o |
| Polyethylene | 0% | o | x |
|  | 3% | o | x |
|  | 5% | o | o |
|  | 10% | o | o |
| Polyester | 0% | o | x |
|  | 10% | o | o |
|  | 20% | o | o |
|  | 30% | Δ | o |
| Polyurethane | 0% | o | x |
|  | 5% | o | o |
|  | 10% | o | o |
|  | 20% | o | o |
|  | 30% | x | o |

Image Evaluation

As an experimental unit was used a copying machine, model EP8600 (made by Minolta Camera K.K.), which was modified so as to be capable of charging to either positive or negative polarity, with a photosensitive member-protective shutter of the invention being mounted therein. Copying tests were made in such a manner that "a copying process was repeated ten thousand times a day and thereafter the shutter is allowed to stand in a protecting condition until the following day", which is counted as one cycle. This process was repeated everyday. For comparison purposes, copying tests were also conducted without such shutter protection as above mentioned. The copying tests were made under the conditions of ambient temperature 30° C. and relative humidity 85%. Where the protective shutter was not actuated, it was observed with K1 and K2 photosensitive members that image flow occurred after 50 thousand copies were made, while with K3 photosensitive member image flow occurred after 70 thousand copies were made. Where the protective shutter was actuated, no image flow occurred with K1, K2 and K3 photosensitive members even after 200 thousand copies were made.

A third embodiment of the present invention will be explained hereinafter.

A photosensitive member-protective shutter to which a shielding member of third embodiment according to the invention is applicable may be such that when copying operation is at a halt, the shielding member (1) is drawn or extended from shutter case (4), as illustrated by way of example in FIG. 7, thereby to cover the surface of the photosensitive member (3) at a location below the charger (2) and protect the photosensitive member from statically produced compounds.

Figure 8:
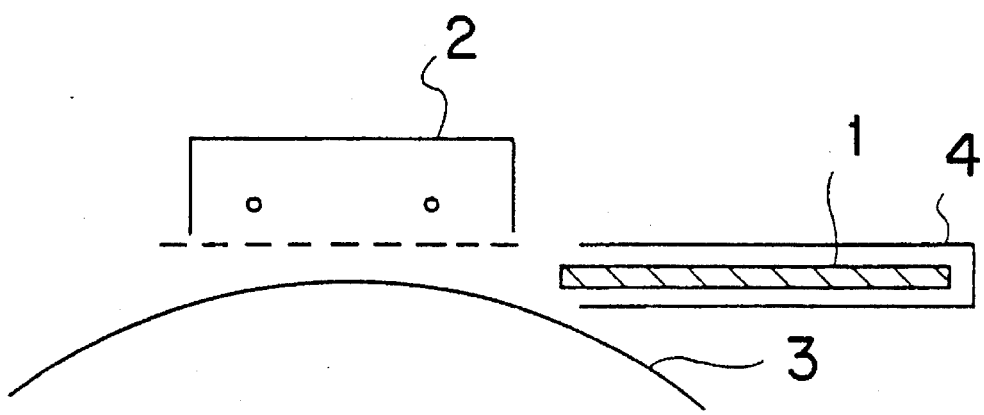
FIG. 8 is a schematic block diagram of the third embodiment of the photosensitive member-protective shutter during a copying operation.
Figure 9:
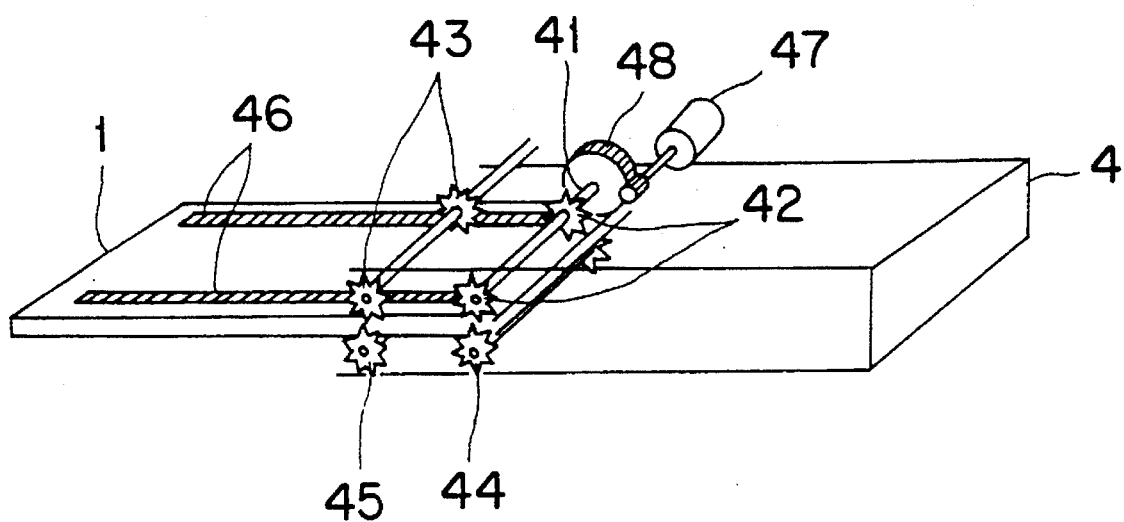
FIG. 9 is a schematic illustration of a driving mechanism of a shielding member in the protective shutter as shown in FIG. 7 and FIG. 8.

During copying operation, the shielding member (1) is received into the shutter case (4) as shown in FIG. 8 so that the surface of the photosensitive member is chargeable by the charger (2).

Gutters (46) are formed on the surface of the shielding member (1). Two pairs of gears (42), (43), (44) and (45) are installed so that they can mesh with the gutters. The gear

(42) is attached to a driving bar. The driving bar (41) is driven through a gear (48) by a motor (47). The motor can rotate the gear (48) clockwise and counterclockwise. The rotation of the motor (47) enables the shielding member (1) to be stored in the shutter case (4) and to be drawn out of the case (4).

The gears (43), (44) and (45) do not have a driving mechanism but take a role to hold the shielding member (1).

Stainless steel basically has high mechanical strength and is suitable for use as shielding material for photosensitive member-protective shutters of the third embodiment.

Stainless steels, in their composition aspect, are broadly classified into Fe-Cr-Ni-based alloys. Structurally there is no particular limitation, so that martensite stainless steel, austenite stainless steel, and ferrite-austenite 2-phase stainless steel may be equally used without limitation. Stainless steels useful for the purpose of the present invention include all modified types of stainless steels, such as niobium-loaded, carbide-stabilized type and sulfur-, selenium-, and lead-loaded free-cutting stainless steels.

In the present invention, of the foregoing types of stainless steels, those containing 2 to 20 wt %, preferably 5 to 15 wt %, more preferably 7 to 10 wt %, of nickel (Ni) are used.

During copying operation (in which the shutter is in storing position), ozone and Nox generate from a discharger. In particular, Nox (whose half life is longer than that of ozone) adsorbs on the discharger and shutter and becomes combined with Fe, Cr and Ni to produce nitrates. Of these nitrates, Fe and Cr nitrates are soluble in water. Therefore, when the film is in its shutter-protecting condition, water-dissolved nitric acid (or nitrous acid ions) will tend to cause image flow, and the shutter itself will become degraded. In contrast, Ni nitrate is immobile and will not cause any image flow.

According to the invention, by using such a stainless steel containing 2 to 20% of Nickel (Ni) as described above as a shielding material for the photosensitive member-protective shutter, statically produced compound formed on the surface of the surface of the shielding material will be immobilized, it being thus possible to prevent degradation of the photosensitive member and any image flow which would otherwise occur due to such degradation.

If the nickel content is less than 2 wt %, some undesirable-compound which is water soluble is statically produced and built up on the surface of the shielding member opposite to the photosensitive member, and this may cause degradation of the photosensitive member and image flow.

The size (expanse) of the shielding member may be suitably determined according to the size of the charger or photosensitive member. Preferably, the shielding member has a thickness of not less than 0.5 mm. If the thickness is less than 0.5 mm, the strength of the shielding member is insufficient, which may affect protection and storing functions of the shielding member adversely.

In the present invention, a photosensitive member-protective shutter in which such shielding material or member is employed may have such a configuration that in an electrophotographic apparatus having at least a photosensitive member and a charger, the shielding member of the shutter is insertible between the photosensitive member and the charger and can be stored in place.

Photosensitive Members Used

The same three types of photosensitive members K1, K2 and K3 as above mentioned were used.

Types of Shielding Materials Used

The following stainless steels (340 mm long×40 mm wide×1 mm thick) were used as shielding members. In the description below, % denotes wt %.

| | |
|---|---|
| SUS430 | Cr 18% |
| SUS410 | Cr 13%, carbon (C) in slight amount |
| SUS405 | Cr 13%, aluminum (Al) in slight amount |
| SUS403 | Cr 13%, carbon |
| SUS431 | Cr 16%, Ni 2% |
| SUS301 | Cr 17%, Ni 7% |
| SUS304 | Cr 18%, Ni 8% |
| SUS321 | Cr 18%, Ni 18%, titanium (Ti) in slight amount |
| SUS309 | Cr 22%, Ni 12% |
| SUS310 | Cr 25%, Ni 20% |

Experimental Equipment

Figure 7:
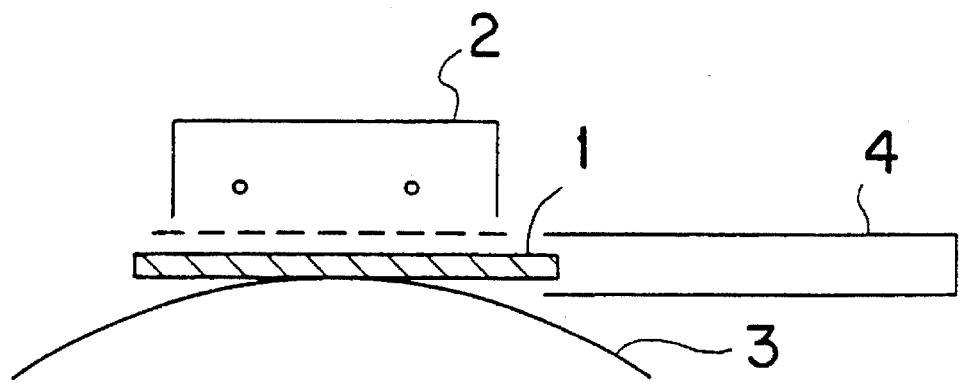
FIG. 7 is a schematic block diagram of a third embodiment of a photosensitive member-protective shutter when a copying operation is stopped.

As an experimental equipment was used a commercially available copying machine (Model EP8600, made by Minolta K.K.), which was so modified as to enable switching between positive charging and negative charging according to the charging polarity of the photosensitive member used, with adaptation for mechanically mounting therein a photosensitive member-protective shutter capable of such configuration as shown in FIG. 7 or FIG. 8.

Evaluation

Evaluation of Static Product Adsorption on Shielding Member

The process of on/off switching of the charger was repeated at an interval of one second for 168 hours while the shielding member is kept in the FIG. 2 condition. The shielding member was placed in contact with an upper edge of a glass case having a diameter of 85 mm and a depth of 17 mm and containing pure water to a depth of 7.5 mm. The shielding member was held in opposed relation to the water surface and was allowed to stand for 12 hours under the conditions of ambient temperature 30° C. and relative humidity of 85%.

Ions, $NO_2^-$ and $NO_3^-$ in statically produced products dissolved in the pure water were measured according to ion chromatography. The results are shown in Table 7 below.

Image Flow Evaluation

Durability test with respect to 200,000 times of copy was carried out while holding the shielding member in the FIG. 6 condition. Thereafter, the shielding member was allowed to stand for 12 hours under the conditions of ambient temperature of 30° C. and relative humidity 85%.

Subsequently, photosensitive member was heated to 40° C. and copying was made using an English character chart as an original. Evaluation was made of images obtained to be ranked as follows.

o: no image flow, no blur.

Δ: blur around characters.

x: characters unreadable.

The results are shown in Table 7 below.

TABLE 7

| | Kind of Metal | Amount of Ions measured | Image Flow K1 | K2 | K3 |
|---|---|---|---|---|---|
| Example | | | | | |
| 1 | SUS310 (Ni: 20%) | 6 ppm | ○ | — | ○ |
| 2 | SUS309 (Ni: 12%) | 9 ppm | ○ | — | ○ |
| 3 | SUS321 (Ni: 8%) | 12 ppm | ○ | — | ○ |
| 4 | SUS304 (Ni: 8%) | 16 ppm | ○ | — | ○ |
| 5 | SUS301 (Ni: 7%) | 15 ppm | ○ | ○ | ○ |
| 6 | SUS431 (Ni: 2%) | 21 ppm | ○ | ○ | ○ |
| Comparative Example 1 | SUS430 (Ni: 0%) | 41 ppm | x | x | △ |
| Comparative Example 2 | SUS410 (Ni: 0%) | 47 ppm | x | — | x |
| Comparative Example 3 | SUS405 (Ni: 0%) | 44 ppm | x | x | x |
| Comparative Example 4 | SUS403 (Ni: 0%) | 38 ppm | x | — | x |

In the table, "—" indicates that no test was made.

Table 7 tells that with stainless steels containing more than 2% Ni, the amount of dissolved static matter was very small. No image flow was found irrespective of the type of photosensitive member.

What is claimed is:

1. An image forming apparatus comprising:
   a rotatably disposed photosensitive member,
   a charger disposed in opposed relation to the surface of the photosensitive member for charging the surface of the photosensitive member, and
   a protection shutter disposed adjacent to the charger, the shutter having a film which statically adheres to the surface of the photosensitive member to shield the surface of the photosensitive member from the charger.

2. The apparatus according to claim 1, wherein the protection shutter comprises a shutter case, a support rod provided within the case for supporting the film, and a driving mechanism for actuating the support rod.

3. The apparatus according to claim 2, wherein the charger is operative to charge the surface of the photosensitive member when an image forming operation is finished, thereby to allow the film to adhere to the surface of the photosensitive member by an electrostatic force generated between the photosensitive member in rotation and the film supported by the support rod, and wherein when an image forming operation is started, the support rod is actuated by the driving mechanism to cause the film adhering to the surface of the photosensitive member to be removed from the photosensitive member.

4. The apparatus according to claim 1, wherein the photosensitive member is selected from the group consisting of an amorphous silicon photosensitive member, a selenium-arsenic photosensitive member, and a photosensitive member having an amorphous carbon layer on its surface.

5. A protection shutter for a member whose surface is charged by a charger, comprising:
   a storing portion disposed adjacent to the charger,
   a film stored in the storing portion, and
   a holding member for movably holding the film between a first position and a second position, the film statically adhering to the surface of the charged member to shield the charged member from the charger at the first position, and the film being retracted from the surface of the charged member at the second position.

6. The shutter according to claim 5, wherein the holding member comprises at least a rotatable support rod and a driving mechanism for actuating the support rod, and wherein during operation of the driving mechanism the film supported by the support rod moves from the first position to the second position.

7. The shutter according to claim 5, wherein the film is rounded at its forward end.

8. The shutter according to claim 5, wherein the film has a semi-spherical convex portion at a surface portion thereof which comes in contact with the charged member.

9. The shutter according to claim 5, wherein the film has a first layer positioned oppositely to the charger, and a second layer which comes in contact with the surface of the charged member, the first layer being formed of a resin that is less liable to the effect of ozone or a nitrogen compound, the second layer being formed of a resin that is less subject to abrasion with the surface of the charged member.

10. An image forming apparatus comprising:
    a rotatably disposed photosensitive member,
    a charger disposed in opposed relation to the surface of the photosensitive member for charging the surface of the photosensitive member, and
    a protection shutter disposed adjacent to the charger, the shutter having a semiconductive film which statically adheres to the surface of the photosensitive member to shield the surface of the photosensitive member from the charger.

11. The apparatus according to claim 10, wherein the protection shutter comprises a shutter case, a support rod provided within the case for supporting the semiconductive film, and a driving mechanism for actuating the support rod.

12. The apparatus according to claim 11, wherein the charger is operative to charge the surface of the photosensitive member when an image forming operation is finished, thereby to allow the semiconductive film to adhere to the surface of the photosensitive member by an electrostatic force generated between the photosensitive member in rotation and the semiconductive film supported by the support rod, and wherein when an image forming operation is started, the support rod is actuated by the driving mechanism to cause the semiconductive film adhering to the surface of the photosensitive member to be removed from the photosensitive member.

13. The apparatus according to claim 10, wherein the photosensitive member is selected from the group consisting of an amorphous silicon photosensitive member, a selenium-arsenic photosensitive member, and a photosensitive member having an amorphous carbon layer on its surface.

14. The apparatus according to claim 10, wherein the semiconductive film has a volume resistivity of $10^4$ to $10^{12}$ $\Omega \cdot cm$.

15. A protection shutter for a member whose surface is charged by a charger, comprising:
    a storing portion disposed adjacent to the charger,
    a semiconductive film stored in the storing portion, and
    a holding member for movably holding the semiconductive film between a first position and a second position, the semiconductive film statically adhering to the surface of the charged member to shield the charged member from the charger at the first position, and the semiconductive film being shunted from the surface of the charged member at the second position.

16. The shutter according to claim 15, wherein the holding member comprises at least a rotatable support rod and a driving mechanism for actuating the support rod, and wherein during operation of the driving mechanism the semiconductive film supported by the support rod moves from the first position to the second position.

17. The shutter according to claim 15, wherein the semiconductive film has a volume resistivity of $10^4$ to $10^{12}$ $\Omega \cdot$cm.

18. The shutter according to claim 15, wherein the semiconductive film is comprised of a carbon-containing resin film.

19. The shutter according to claim 15, wherein the semiconductive film is comprised of a resin film which contains metal particles or an organic electroconductive compound.

20. The shutter according to claim 15, wherein the semiconductive film is rounded at its forward end.

21. The shutter according to claim 15, wherein the film has a semi-spherical convex portion at a surface portion thereof which comes in contact with the surface of the photosensitive member.

22. The shutter according to claim 15, wherein the semiconductive film has a first layer positioned oppositely to the charger, and a second layer which comes in contact with the surface of the charged member, the first layer being formed of a resin that is less liable to the effect of ozone or a nitrogen compound, the second layer being formed of a resin that is less subject to abrasion with the surface of the charged member.

23. An image forming apparatus comprising:

a rotatably disposed photosensitive member, a charger disposed in opposed relation to the surface of the photosensitive member for charging the surface of the photosensitive member, and a shielding member disposed adjacent to the charger for shielding the surface of the photosensitive member from the charger thereby to protect the surface of the photosensitive member, the shielding member being made of a nickel-containing stainless steel.

24. The apparatus according to claim 23, wherein the shielding member is comprised of a stainless steel containing 2 to 20 percent by weight of nickel.

25. The apparatus according to claim 23, wherein the shielding member is housed in a case disposed adjacent to the charger so that the shielding member is drawn from the case when an image forming operation is finished for shielding the surface of the photosensitive member from the charger and is stored into the case when an image forming operation is started.

26. A protection shutter for a charged member whose surface is charged by a charger, comprising:

a storing portion disposed adjacent to the charger, and a shielding member housed in the storing portion, the shielding member being operative to shield the surface of the charged member from the charger to protect the surface of the charged member, and the shielding member being made of a nickel-containing stainless steel.

27. The shutter according to claim 26, wherein the shielding member is made of a stainless steel containing 2 to 20 percent by weight of nickel.

28. The shutter according to claim 26, wherein the shielding member has a thickness of not less than 0.5 mm.

29. A method for protecting a rotatable photosensitive member in an image forming apparatus, comprising:

disposing a charger in face to face relation to a photosensitive member, charging the surface of the photosensitive member by the charger to a predetermined voltage when an image forming operation is finished, rotating the photosensitive member at a predetermined peripheral speed, and causing the film to come into intimate contact with the surface of the photosensitive member by an electrostatic force generated between the photosensitive member in rotation and the film so that the film may be placed between the surface of the photosensitive member and the charger, and shielding the surface of the photosensitive member from the charger.

30. The method according to claim 29, further comprising the step of shunting the film from the surface of the photosensitive member.

* * * * *